March 23, 1965 G. GUANELLA 3,175,154

PULSE CODE MODULATION TRANSMISSION SYSTEM

Filed April 26, 1961 4 Sheets-Sheet 1

INVENTOR.
Gustav Guanella

BY

ATTORNEY

INVENTOR.
Gustav Guanella
BY
[signature]
ATTORNEY

INVENTOR.
Gustav Guanella
BY
[signature]
ATTORNEY

INVENTOR.
Gustav Guanella

BY [signature]

ATTORNEY.

United States Patent Office 3,175,154

Patented Mar. 23, 1965

3,175,154

PULSE CODE MODULATION TRANSMISSION SYSTEM

Gustav Guanella, Zurich, Switzerland, assignor of sixty percent to Karl Rath, New York, N.Y.

Filed Apr. 26, 1961, Ser. No. 105,806
7 Claims. (Cl. 325—38)

The present invention relates to improved means for and a method of transmitting a varying magnitude by pulse code modulation, more particularly to the telemetering of electrical magnitudes, such as current or voltage, being subject to both relatively slow and small variations to be transmitted with high accuracy, such as for the remote energization of an indicator, electricity meter etc., as well as to relatively rapid and large variations to be transmitted substantially instantly or with a minimum of time delay, such as for the remote energization or control of a safety device or the like.

It has already become known to transmit a variable measuring value such as the current in a high tension line from the measuring point to a remote control station by sampling the instantaneous current values at equidistant instants or time positions and quantize or to convert the sampling values by suitable encoding means into groups of binary pulse signals transmitted consecutively in the form of a continuous pulse series. As an example, if the magnitude being transmitted is subdivided into 128 digital steps or quantizing levels, each of the sampling values may be represented with a corresponding degree of accuracy by means of seven binary signals or digit pulses. The two possible values or bits of each binary signal may be characterized in a known manner by the presence and absence, respectively, of a pulse within the coordinated binary interval determined by the operating (clock) frequency of the system.

With a system or method of this type, assuming a given maximum pulse repetition frequency or capacity of the transmitting channel or link between the measuring and receiving points, an increase of the number of binary digits of each pulse group, to increase the transmitting accuracy, is possible only by simultaneously increasing the time intervals between the successive samplings of the magnitude being transmitted. As a consequence, an increase of the transmitting accuracy requires an increase of the time constant, the latter being defined as the delay necessary in the reconstruction of the sampling values by the received pulses, that is, the time between the arrival of the first and the last digit pulse of the groups representing the respective sampling values. In other words, a decrease of the time constant results in a loss of accuracy of the transmitted signal variations, and vice versa.

An important object of the present invention is the provision of an improved pulse code modulation transmission system and a method of operating the same of the general type referred to by which the transmitting accuracy, especially for relatively slow variations of the magnitude being transmitted may be increased, substantially without increasing the operating pulse repetition frequency or capacity of the transmission circuit or channel.

Among the further objects of the invention is the provision of conversion and reconversion means for achieving the foregoing object which are relatively simple both in construction as well as operation; which may consist substantially of solid state devices; and which will require a minimum of supervision and attendance during use or operation.

The invention, both as to its ancillary objects and novel aspects, will be better understood from the following detailed description taken in conjunction with the accompanying drawings, forming part of this specification and in which—

Like reference characters denote like parts and magnitudes throughout the different views of the drawings.

With the foregoing objects in view, the invention involves generally the provision, in connection with a pulse code modulation transmission or telemetering system of the type involving the periodic sampling of the instantaneous values of a variable electrical magnitude and conversion of the sampling values into a plurality of groups of primary binary digit or signal pulses representing binary numbers proportional to the respective sampling values, of synchronous time delay means for displacing at least one subgroup comprising a fractional number of digit pulses of predetermined ones of said groups of primary pulses recurring in predetermined order such as to produce a series of secondary digit pulses having a repetition frequency being a predetermined fraction of the repetition frequency of said primary pulses and encompassing or being representative of at least one high accuracy or finely quantized signal component of relatively large time constant proportional to the slow variations of the magnitude being transmitted and constituted by all the digit pulses of said groups and one low accuracy or coarsely quantized signal component of relatively low time constant proportional to the relatively rapid variations of said magnitude and constituted by a fractional portion of the digit number of said groups. The thus obtained secondary pulse series of reduced repetition frequency may be transmitted through a channel of limited capacity or reduced operating pulse repetition frequency, or the accuracy of a given transmitting channel may be increased by the use of the method according to the invention, at least as far as the relatively slow variations of the transmitted magnitude are concerned. At the receiver, the low and high accuracy signal components carried by the converted or secondary pulse series are separated from one another by means of suitable synchronous switching means and the final decoded and demodulated signals applied to suitable output devices. Thus, for instance, the high accuracy output signal having a large time constant and representing the slow or gradual variations of the current in a high tension line may be applied to a current indicator, wattmeter or the like output or control device in the operation of which the large signal time constant is of little or no consequence but which requires a high accuracy in rendering the relatively slow or gradual current variations at the measuring point, while the low accuracy and low time constant signal component may be applied to a cut-out or the like safety device to be operated instantly or without delay upon the current at said point assuming a sudden and dangerously low or high value.

Figure 1:
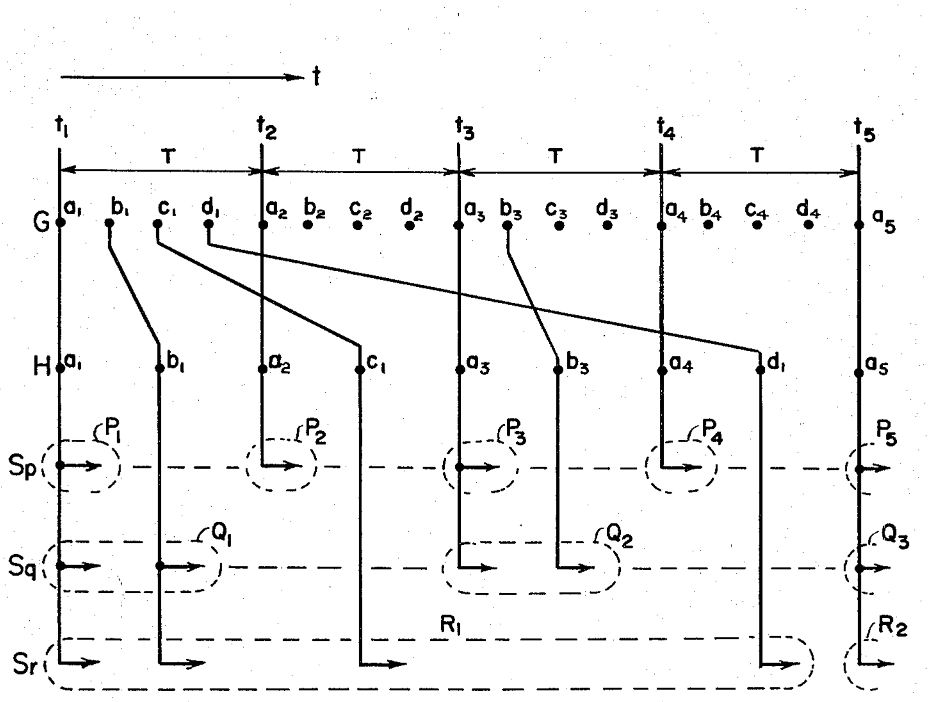
FIG. 1 is a theoretical diagram explanatory of the underlying principle and operation of the invention.
Figure 2:
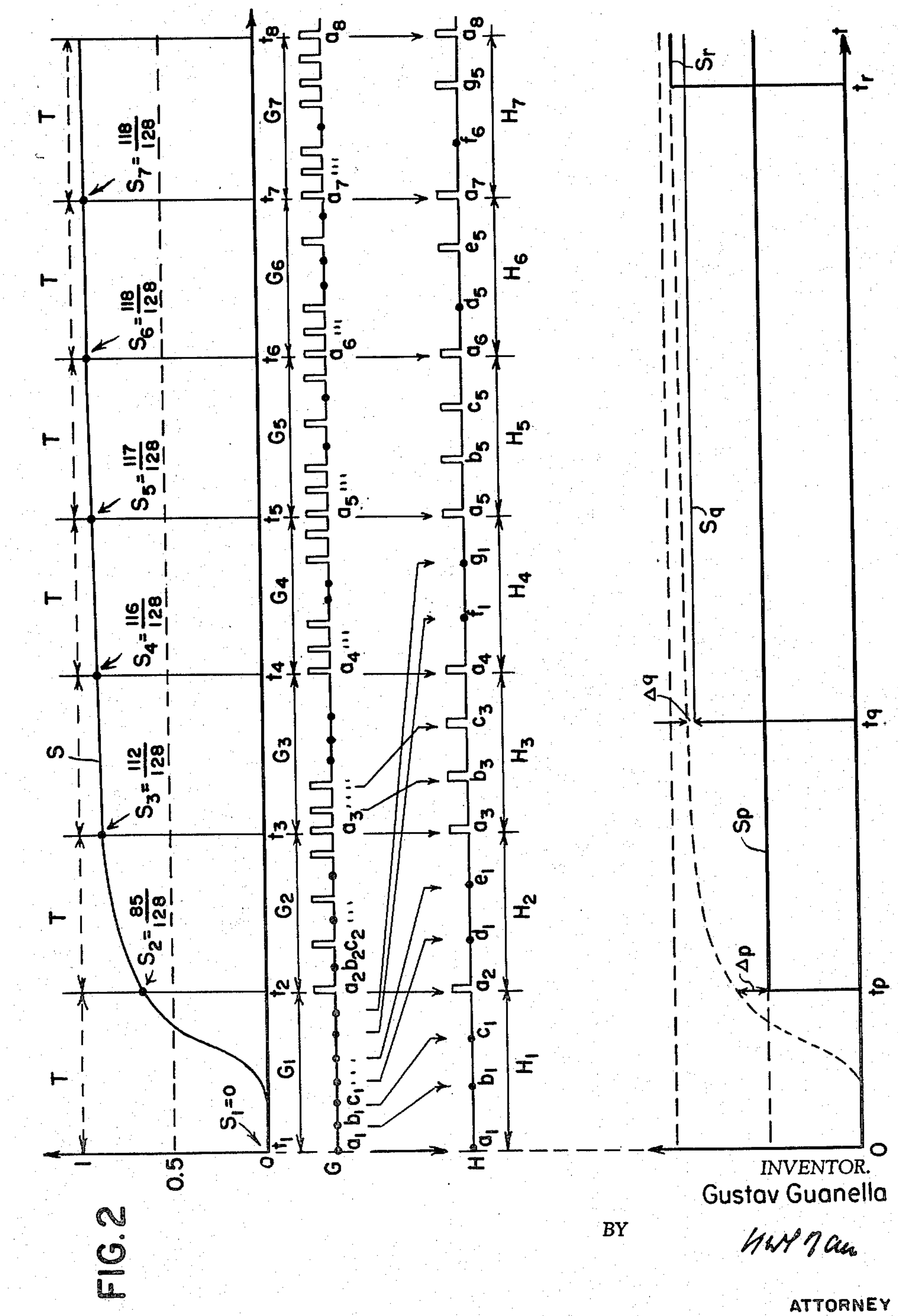
FIG. 2 is a diagram similar to FIG. 1, illustrating by way of example, an alternative scheme or method for carrying into effect the invention.

Referring more particularly to FIG. 1 of the drawings, let it be assumed that a varying magnitude is sampled at the equidistant instants or time positions $t_1$, $t_2$, $t_3$ . . . following each other at predetermined time intervals T. The instantaneous sampling value at the time $t_1$ is further assumed to be represented by four binary signals or digits $a_1$, $b_1$, $c_1$, $d_1$ forming the first group of a primary pulse series G. As a consequence, the signals $a_1$–$d_1$ represent a binary number which at least approximately represents the respective sampling value in the binary number system or notation. Thus, in the example shown, assuming four binary signals or digits for each group or sampling value, the maximum number corresponds to the number 16 in the decimal system, whereby the sampling values will be subdivided into 16 (0 to 15) digital steps or intervals. If a greater accuracy is desired, the number of binary digits may be increased, such as to seven digits with the result of a subdivision into 128 steps or increments, as shown in FIG. 2 to be described presently.

More particularly, in FIG. 1 a pulse appearing at $a_1$ will have a value of 8, a pulse appearing at $b_1$ will have a value of 4, a pulse appearing at $c_1$ will have a value of 2 and a pulse appearing at $d_1$ will have a value of 1 corresponding to the decimal system. Thus, for instance, if the measuring (sampling) value at the instant $t_1$ is equal to eleven digital steps or increments, the binary signal may be represented by the group $+-++(8+2+1)$, wherein $+$ signifies the presence and $-$ signifies the absence of a pulse in the binary notation or representation in a manner well known. The signal $a_1$ occurs substantially without delay at the instant $t_1$, while the signals $b_1$, $c_1$ and $d_1$ are retarded by intervals which increase progressively in accordance with the operation pulse repetition or clock frequency of the system, that is, the smaller the sampling value the greater will be the delay in rendering the same at the receiver. All that has been said about the group $a_1$, $b_1$, $c_1$, $d_1$ occuring at the instant $t_1$ equally applies to the group $a_2$, $b_2$, $c_2$, $d_2$ occuring at the instant $t_2$ and so on for the succeeding groups of the series G representing the following sampling values of the magnitude being transmitted. In FIG. 1, the primary pulse series G shown includes four complete sampling or pulse groups of binary signals ($a_1$ to $d_4$) as well as the first digit or signal $a_5$ of the fifth group.

The problem according to the present invention is to convert the primary pulse series G having a pulse repetition frequency $n/T$, wherein $n$ represents the number of binary digits (four in the example shown) into a secondary pulse series H having a pulse repetition frequency being a predetermined fraction of the frequency of the series G, that is, one half of the latter in the example shown, in an effort to improve the capacity of the transmitting channel or link or to increase the accuracy of the signal transmission at least for the relatively slow changes of the magnitude being transmitted. More particularly, the conversion from the series G into the series H according to the invention is such as to retain in the converted series all the information necessary for the reconstruction of a relatively high accuracy or finely quantized signal component $S_r$ having a large time constant, of a practically instantaneous or coarsely quantized signal component $S_p$ of lower accuracy and of a signal component $S_q$ of intermediate accuracy and time constant.

More specifically, in the example shown the signal component $S_p$ is composed solely of the binary signal pulses or digits $a_1$, $a_2$, $a_3$, . . . , the accuracy of this signal being rather limited by indicating only in which half of the total measuring range the instantaneous (sampling) magnitude is located at the instants $t_1$, $t_2$ . . . Since the binary signals $a_1$, $a_2$ . . . are transferred directly or without delay from the series G into the series H, the resulting signals $P_1$, $P_2$ . . . representing the component signal $S_p$ will be available substantially instantly or with the least possible time delay, whereby the signal $S_p$ may serve, for instance, for the instant release or operation of a protective device upon the occurrence of a surge or sudden large current change in a transmission line or network.

The signal $S_q$ is composed of the two first binary signals of every second group G, that is, groups 1, 3, 5 . . . in the example illustrated occurring in predetermined recurrent order and comprising the binary signals $a_1$, $b_1$, $a_3$, $b_3$, $a_5$, $b_5$ . . . As a consequence, such a signal at the receiver indicates at the earliest at the instant of arrival of the signals $b_1$, $b_3$, $b_5$ within which quarter of the total measuring range are contained the respective sampling values. In other words, while the lower accuracy component signals $P_1$, $P_2$, . . . of the sigal $S_p$ follow each other at a frequency $1/T$, the component signals $Q_1$, $Q_2$, . . . of the signal $S_q$ follow each other at a frequency ½T or with twice the time constant of the former signals.

Finally, the high accuracy signal $S_r$ is composed of all the binary signals of every fourth group or groups 1, 5, 9 . . . and represents the measuring magnitude with a maximum of accuracy, although the changes will be available only at intervals of 4T, that is, with a virtual sampling frequency of ¼T. This is due to the fact that in the series H the signal $c_1$ can be fitted only between $t_2$ and $t_3$ and the signal $d_1$ can be fitted only between $t_4$ and $t_5$, a cycle of four intervals T being thus required for representing the complete high accuracy signals $R_1$, $R_2$ . . . . The binary signals $b_2$, $c_2$, $d_2$, $c_3$, $d_3$, $b_4$, $c_4$, $d_4$ of the series G remain unused in the transmission scheme according to FIG. 1.

Referring to FIG. 2, there is shown by way of example and in greater detail an alternative method of transmitting a measuring value S comprising three components $S_p$, $S_q$ and $S_r$ of different accuracy and time constant in accordance with the invention. The sampling values occurring at the instants $t$ are converted into seven binary signals $a$ to $g$ of the coordinated pulse groups, to form a primary pulse series G, by means of suitable encoding means known in the art, whereby the values measured are subdivided into 128 digital steps or increments. The change of the value S shown in the drawing may represent, for instance, the current in a high tension line during a switching operation. More specifically, it is assumed that at the instant $t_1$ the sampling value $S_1$ is equal to zero, that at the instant $t_2$ the sampling value $S_2$ equals $^{85}/_{128}$, that at the instant $t_3$ the sampling value $S_3$ equals $^{112}/_{128}$, and so on as indicated. As a consequence, there are no current pulses during the binary intervals of the first group, while the signals of the second group may be represented as $+-+-+-+(64+16+4+1=85)$, the signals of the third group may be represented as $+++----(64+32+16=112)$ and so on. The series G in the drawing is shown to comprise a complete set of seven groups $G_1$ to $G_7$ with the intervals devoid of a pulse and represented by the minus signs in the foregoing notation being characterized by solid circles in the drawing.

In order to reduce the capacity of the transmission channel or link, it is assumed that the pulse repetition frequency $7/T$ of the primary pulse series G is to be reduced to a frequency $3/T$ of the secondary series H utilized for the transmission according to the invention. Furthermore, it is assumed that the information to be transmitted should be such as to enable the reconstruction at the receiving end of a substantially non-retarded component signal $S_p$ being constituted by the binary signals $a$ of all the groups G, of a signal component $S_r$ of maximum accuracy utilizing all the binary signals of each fourth group G, and of a signal component $S_q$ of intermediate accuracy and time constant and being composed of the first three binary signals of each second one of the primary groups $G_1$, $G_2$, $G_3$ . . . , the binary signals representing the component signals of increased accuracy $S_q$ and $S_r$ being interposed within the gaps left in substantially the analogous manner as in the case of FIG. 1, to result in the staggered secondary pulse groups $H_1$, $H_2$, $H_3$ . . . of reduced repetition frequency. In other words, the binary signals *a* representing the low accuracy signal component $S_p$ are transmitted substantially without delay, the binary signals *b* and *c* representing the intermediate accuracy signal component $S_q$ are inserted within each second group immediately after the signals *a*, while the remaining gaps are filled by the binary signals *d*, *e*, *f* and *g* of each of the fourth groups $G_1$, $G_4$, $G_8$. As a consequence, the lower time constant or undelayed signal $S_p$ is effectively sampled at intervals of T or at the instants *t*, the intermediate accuracy signal $S_p$ is effectively sampled at intervals of 2T or at the instants $t+2/3T$, while the high accuracy signal component $S_r$ is effectively sampled at intervals of 4T or at the instants $t+2\,2/3T$. In other words, a relatively large change of the current will be indicated by the signal $S_p$ at the latest after lapse of a time interval T, while the smallest measurable change of the current will be indicated by the signal $S_r$ at the latest after lapse of a time interval $6\,2/3$T. In the lower part of FIG. 2 this is shown more clearly by the signal components $S_p$, $S_q$ and $S_r$, that is, the signal $S_p$ indicating the measuring value with an error or tolerance $\Delta p<1/2$ at the instant $t_p$ or immediately after the sampling instant $t_2$, while the signal $S_q$ will appear with an error $\Delta q<1/8$ and a delay of $2/3$T at the instant $t_r$ or after the sampling instant $t_3$. The high accuracy signal $S_r$ is reproduced with an error of $\Delta r<1/128$ and is fully available at the earliest after the occurrence of the last binary signal of each seventh group of the series G.

Figures 3, 3A:
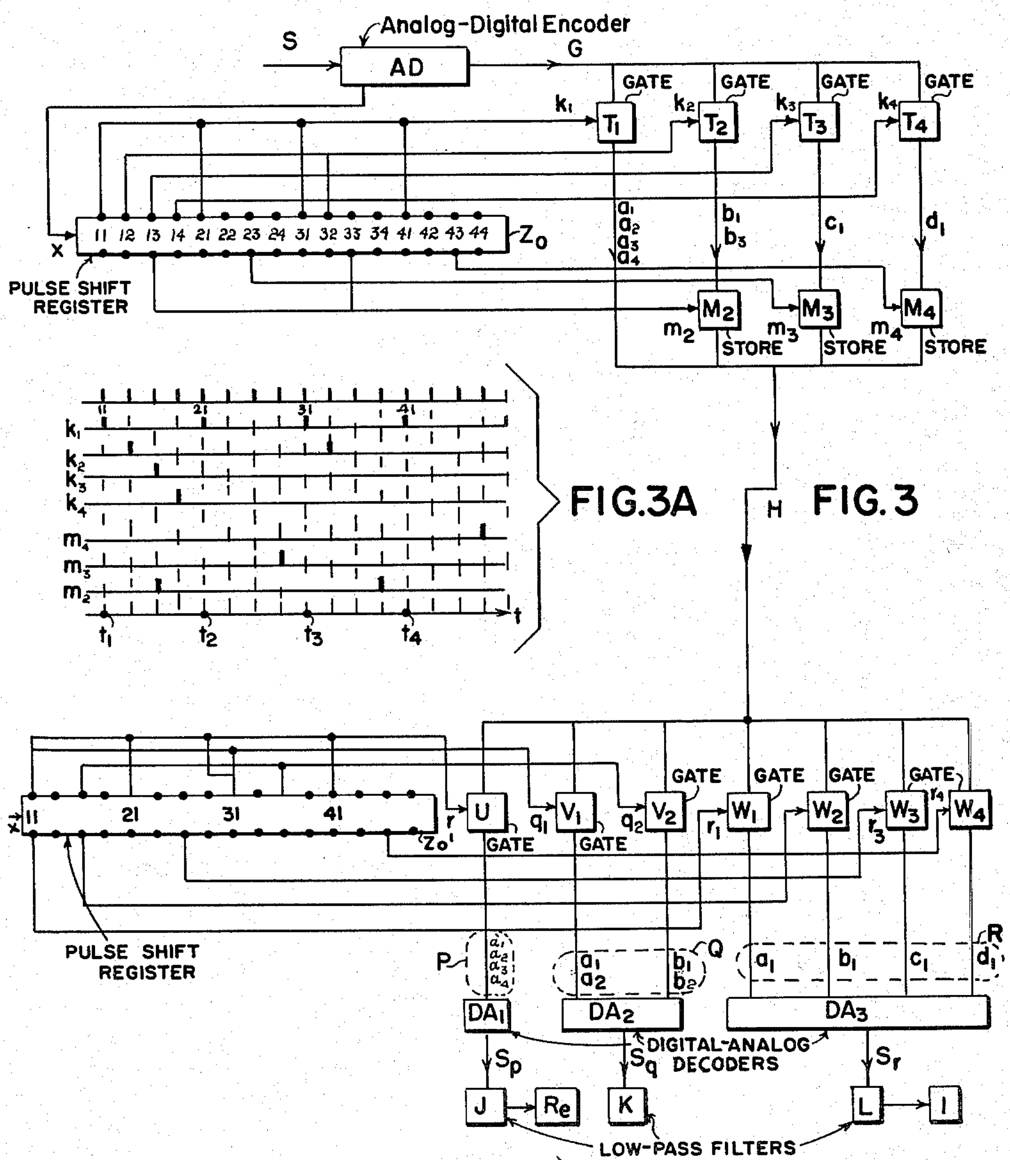
FIG. 3 is a block diagram of a complete pulse code modulation transmitting and receiving system constructed in accordance with the principles of the invention and based on the transmission scheme shown by FIG. 1.
FIGS. 3A and 3B are diagrams explanatory of the operation of FIG. 3.

Referring to FIG. 3 which shows by way of example and in block diagram form a complete transmitting and receiving system according to the invention based upon the pulse conversion scheme or method according to FIG. 1, the original signal S to be transmitted is converted into the primary pulse series G by means of an analog-digital converter or encoder AD of known construction, the resultant output pulses of the encoder being simultaneously applied to the inputs of a plurality of gating devices $T_1$, $T_2$, $T_3$, $T_4$ equal in number to the number of binary digits, that is, four in the example illustrated. The gates $T_1$–$T_4$ are controlled by synchronous control pulses $k_1$, $k_2$, $k_3$, $k_4$ in such a manner as to produce signals $a_1$, $a_2$, $a_3$, $a_4$, at the output of the gate $T_1$, to produce signals $b_1$, $b_3$ at the output of gate $T_2$, and to produce signals $c_1$ and $d_1$ at the outputs of gates $T_3$ and $T_4$, respectively. The outputs of the gates $T_2$, $T_3$ and $T_4$ are connected to suitable pulse storing devices $M_2$, $M_3$ and $M_4$, respectively, to be stored during predetermined intervals and to be released upon a common output circuit by the application of suitable read-out control pulses $m_2$, $m_3$ and $m_4$, in such a manner as to result in the secondary pulse series H in said circuit comprising all the outputs of the storage devices in addition to the output of the gate $T_1$.

The control pulses $k_1$–$k_4$ for the gates $T_1$–$T_4$ as well as the control pulses $m_2$–$m_4$ for the storing devices $M_2$–$M_4$ which are related according to the time program of FIG. 3A are produced, in the example shown, by means of a pulse shifting register $Z_0$ which is provided with 16 outputs and which operates in a known manner by shifting a single output pulse consecutively from one to the next output in synchronism with a series of input or shifting pulses *x* having a repetition frequency equal to the operating or clock frequency of the original pulse series G. In the example shown, certain of the control pulses, for instance, $k_3$, $k_4$ are derived from single outputs (13, 14) of the register, while other pulses, for instance $k_1$, are obtained by addition of several outputs (11, 21, 31, 41) of the register $Z_0$. As a result, the signals $a_1$, $a_2$, $a_3$, $a_4$ are transmitted to the common outputs circuit without delay, while the signals $b_1$, $b_3$ as well as $c_1$, $d_1$ are delayed by predetermined intervals such as to result in the secondary series H of FIG. 1 having a frequency equal to one half of the frequency of the primary pulse series G. In the same manner, a pulse series of reduced frequency may be produced on the basis of any other conversion program, such as shown by FIG. 2, in accordance with the underlying principle and teaching of the invention.

At the receiving end, the pulses H are applied to all the inputs of a number of groups of gates U; $V_1$, $V_2$; $W_1$, $W_2$, $W_3$, $W_4$, respectively, the signals P composed of $a_1$, $a_2$, $a_3$, $a_4$ . . . being separated by the gate U, the signals Q composed of $a_1$, $a_2$, $b_1$, $b_2$ . . . being separated by the gates $V_1$ and $V_2$, and the signals R composed of $a_1$, $b_1$, $c_1$, $d_1$, . . . being separated by the gates $W_1$, $W_2$, $W_3$ $W_4$, to reconstruct the component signals $S_p$, $S_q$ and $S_r$ by means of well-known digital-analog decoders $DA_1$ $DA_2$ and $DA_3$, respectively. The reconstructed signals may be applied to suitable demodulating means, J, K, L, such as low-pass filters and may serve to energize a cut-out relay $R_e$ (signal $S_p$) and a wattmeter I (signal $S_r$), in the manner described hereinabove.

Figure 3B:
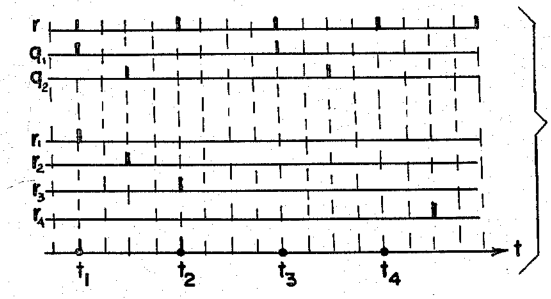

The timing program for the control pulses *r*, $q_1$, $q_2$, $r_1$, $r_2$, $r_3$, $r_4$ for the gates U, $V_1$, $V_2$, $W_1$, $W_2$, $W_3$, $W_4$ is shown in FIG. 3B, the pulses being produced by a register $Z_0'$ similar to the register $Z_0$ and operated at a reduced repetition frequency, such as by utilizing every second output of the register as shown in the drawing.

Figures 4, 5:
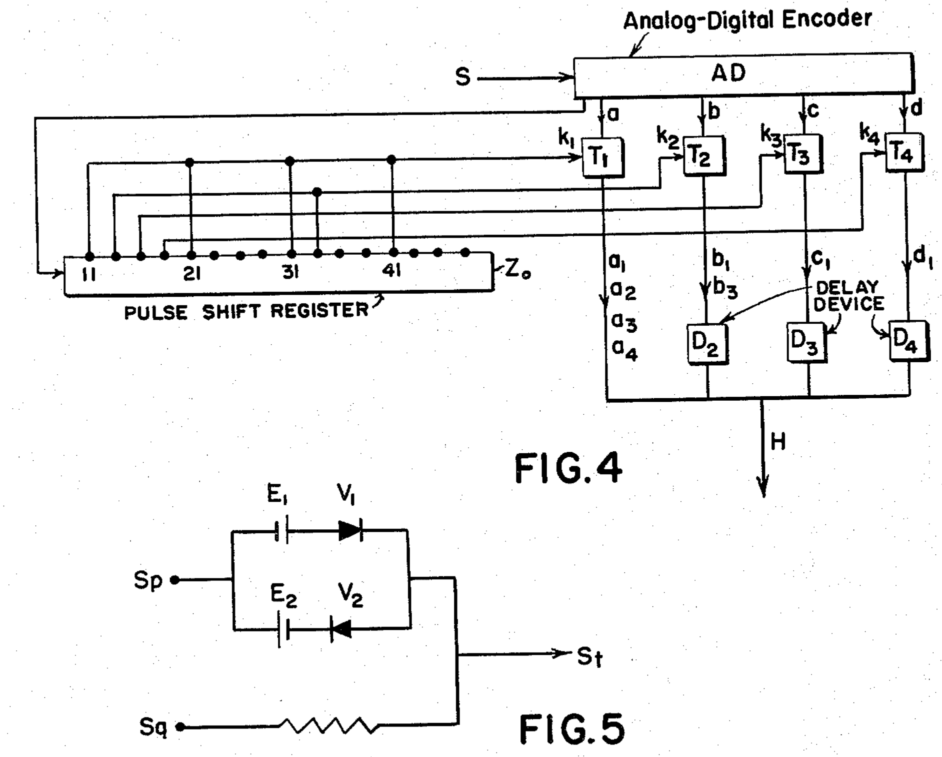
FIG. 4 is a partial diagram of FIG. 3, showing a modification thereof.
FIGS. 5 and 6 are circuit diagrams illustrating an improved feature of the invention.

The system according to the invention may also be used in connection with coding systems of the type wherein the binary signals *a*, *b*, *c*, *d* appear simultaneously at intervals T rather than in succession as shown in FIG. 1. In such a case, the same gate and register arrangement may be used as shown in FIG. 4 for the conversion of the primary series G into the secondary series H, as shown in FIG. 4. The latter further differs from the FIG. 3 arrangement in that the storing devices $M_2$, $M_3$, $M_4$ are replaced by delay devices $D_2$, $D_3$, $D_4$. In the example illustrated, the device $D_2$ is designed to produce a delay of a single binary pulse interval, while $D_3$ is designed to produce a delay of four pulse intervals and $D_4$ is designed to produce a delay of eleven pulse intervals, whereby again to result in the conversion of the pulse series G into the series H which may be transmitted to a receiving point through a suitable transmission channel or link and converted into low accuracy—low time constant and high accuracy—high time constant component signals in the manner described herein.

In certain cases, it may be advantageous to produce a single output signal by combining the low accuracy and high accuracy components into a composite signal representative of both the slow and rapid variations of the magnitude S being transmitted. FIG. 5 shows by way of example a circuit for combining the components $S_p$ and $S_q$ into a composite signal $S_t$, said circuit comprising the paths for the signals $S_p$ and $S_q$ in parallel and including a pair of biased rectifiers or diodes $V_1$ and $V_2$ in parallel and inserted in the branch circuit for the signal $S_p$. In such a circuit with the rectifiers $V_1$ and $V_2$ connected in an opposite sense relative to one another, the composite signal $S_t$ is normally constituted by the accurate and delayed component $S_q$, while a rapid change in either direction represented by the component $S_p$ upon exceeding the respective biasing voltage $E_1$ or $E_2$ causes a corresponding increase of the composite signal $S_t$. The bias of the rectifiers is advantageously at least approximately equal to the maximum error $\Delta p$ (see FIG. 2), whereby a change of $S_q$ will occur only after $S_p$ exceeds the error limit. In place of the batteries $E_1$ and $E_2$ shown as biasing sources, Zener reference diodes having a corresponding breakdown voltage may be utilized for the purpose of the invention.

Figure 6:
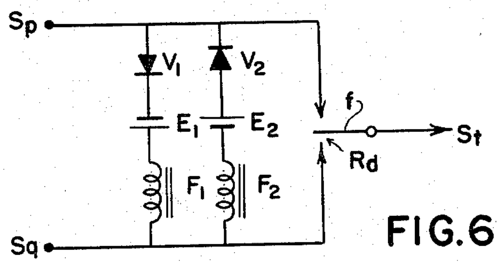

FIG. 6 shows an alternative combining circuit comprising a pair of windings $F_1$ and $F_2$ of a differential relay $R_d$ each connected in series with one of the biased rectifiers $V_1$ and $V_2$, respectively. The relay contact *f* normally allows the accurate signal component $S_q$ to pass to the output $S_t$, while a sudden change of the magnitude S being transmitted will at first be exhibited by the signal $S_q$ in view of the reduced time constant, in such a manner as to cause the switching of the output $S_t$ to the input $S_p$ by the contact *f*.

The gates $T_1$–$T_4$ of FIG. 3 may be of any suitable type or design known in the art, such as multi-grid vacuum tubes, diode, transistor or the like solid state gating devices, etc. Similarly, the storage devices $M_2$–$M_4$ may be in the form of simple flip-flops having set and unset electrodes, magnetic and the like stores having read-in and read-out electrodes and being well known in the art of digital or pulse techniques. The same applies to the delay devices $D_2$–$D_4$ of FIG. 4 which advantageously are in the form of simple electrical or supersonic delay circuits or devices also well known in the art.

In the foregoing the invention has been described by way of example and in reference to a specific illustrative system. It will be evident, however, that variations and modifications, as well as the substitution of equivalent parts or devices for those shown herein for illustration, may be made without departing from the broader scope and spirit of the invention as set forth in the appended claims. The specification and drawings are accordingly to be regarded in an illustrative rather than in a restrictive sense.

I claim:

1. In a system for transmitting a varying electrical magnitude being subject to both relatively small and slow and relatively large and rapid variations by means of pulse code modulation comprising means for periodically sampling the instantaneous values of said magnitude at a predetermined sampling frequency, analog-digital encoding means to convert the sampling values into a continuous primary series of consecutive groups of binary digit pulses representing binary numbers proportional to the respective sampling values, each of said groups comprising a predetermined digit number corresponding to a desired maximum accuracy in representing said magnitude, to result in a predetermined pulse repetition frequency of said primary series, synchronous pulse delay means to displace fractional numbers of the digit pulses of spaced groups of said series recurring in predetermined order such as to produce a secondary series of digit pulses from said primary series having a repetition frequency being a predetermined fraction of said primary pulse repetition frequency and including components representative of at least one relatively finely quantized signal component of relatively large time constant representing said slow variations of said magnitude and constituted by substantially all the digit pulses of said groups and of one relatively coarsely quantized signal component of relatively low time constant representing said rapid variations of said magnitude and constituted by digits forming a fraction of said predetermined digit number, means to transmit said secondary pulse series to a receiving point, synchronous selective switching means for separating the received pulses into groups representing said finely and coarsely quantized signal components, and means including digital-analog decoding means to demodulate said last groups, whereby to produce separate output signals representative of said low and rapid variations, respectively, of the magnitude being transmitted.

2. In a pulse code modulation transmission system as claimed in claim 1, including a pair of output devices responsive to relatively slow and relatively rapid changes of said magnitude and controlled, respectively, by the corresponding output signals produced by said last means.

3. In a pulse code modulation transmission system as claimed in claim 1, including means to combine the decoded pulse signals into a composite signal including both the slow and rapid variations of the magnitude being transmitted.

4. In a pulse code modulation transmission system as claimed in claim 1, said pulse delay means comprising a plurality of gating devices one for each binary digit of said groups, each of said devices having an input, an output and a control electrode, means to apply said primary pulse series to the inputs of all of said devices in parallel, individual pulse storage devices having inputs connected to the outputs of predetermined ones of said gating devices and having their outputs connected in parallel with each other and the outputs of the remaining ones of said gating devices to form a common output circuit, a pulse shifting register having a plurality of outputs and operated at a shifting rate corresponding to said primary pulse repetition frequency, connections between the control electrodes of said gating devices and predetermined ones of the outputs of said register, to successively apply the digit pulses of each group to said storage devices, and read-out electrodes for said storage devices connected to predetermined outputs of said register, whereby to release the stored signals in predetermined sequence such as to result in the setting up of said secondary pulse series in said output circuit.

5. In a pulse code modulation transmission system as claimed in claim 1, said pulse delay means comprising a plurality of gating devices one for each binary digit of said group, each of said devices having an input, an output and a control electrode, means to apply said primary pulse series to the inputs of all of said devices in parallel, a pulse shifting register having a plurality of outputs and operated at a shifting rate corresponding to said primary pulse repetition frequency, connections between the control electrodes of said devices and predetermined ones of the outputs of said register, to successively apply the digit pulses of each group to said devices, and time delay devices having inputs each connected to one of the outputs of predetermined ones of said gating devices and having their outputs connected in parallel with each other and with the outputs of the remaining gating devices, to form a common output circuit, whereby to result in the setting up of said secondary pulse series in said output circuit.

6. In a pulse code modulation transmission system a claimed in claim 1, said last means being comprised of groups of gating devices each having an input, an output and a control electrode, the number of devices of each group corresponding to the number of binary digits representing the respective low and high accuracy signal, means to apply the received secondary pulse series to the input of all of said devices in parallel, a pulse shifting register having a plurality of outputs and operated at a shifting rate equal to the repetition frequency of said secondary pulse series, common output circuits for each of said groups of gating devices, and connections between predetermined outputs of said register and the control electrodes of said devices, to result in the reconstruction of said high and low accuracy pulse signals in said respective output circuits.

7. In a system for transmitting a varying electrical magnitude being subject to both relatively small and slow and relatively large and rapid variations by means of pulse code modulation comprising means for periodically sampling the instantaneous values of said magnitude at a predetermined sampling frequency, analog-digital encoding means to convert the sampling values into a continuous primary series of consecutive groups of binary digit pulses representing binary numbers proportional to the respective sampling values, each of said groups having a predetermined digit number corresponding to a desired maximum conversion accuracy of the respective sampling values and resulting in a predetermined pulse repetition frequency of said primary series, synchronous pulse delay means for displacing predetermined pulses following the first pulse of spaced groups of said series recurring in predetermined order such as to produce a series of secondary digit pulses from said primary series having a repetition frequency being a predetermined fraction of said primary pulse repetition frequency and including components representative of at least one relatively coarsely quantized signal of low time constant constituted by the first digit of each of said groups and one relatively finely quantized signal of relatively large time constant and constituted by substantially all the digit pulses said groups, respectively, means to transmit said secondary pulse series to a receiving point, synchronous selective switching means for separating the received pulses into groups representing said finely and coarsely quantized signals, and means including digital-analog decoding means to demodulate the separated pulse groups and to produce output signals representative of said low and rapid variations, respectively, of the magnitude being transmitted.

References Cited by the Examiner

UNITED STATES PATENTS

| | | | |
|---|---|---|---|
| 2,946,851 | 7/60 | Kretzmer | 325—44 |
| 2,949,505 | 8/60 | Kretzmer | 325—38 |

DAVID G. REDINBAUGH, *Primary Examiner.*

L. MILLER ANDRUS, *Examiner.*